United States Patent [19]
Widmer et al.

[11] Patent Number: 5,265,128
[45] Date of Patent: Nov. 23, 1993

[54] METHOD AND DEVICE FOR THE DIGITAL TRANSMISSION OF INFORMATION IN SHORT-WAVE RADIO NETWORKS

[75] Inventors: Hanspeter Widmer, Egg b. Zürich; Roland Küng, Wolfhausen, both of Switzerland

[73] Assignee: Ascom Zelcom AG, Hombrechtikon, Switzerland

[21] Appl. No.: 333,983

[22] Filed: Apr. 5, 1989

[30] Foreign Application Priority Data

Apr. 7, 1988 [CH] Switzerland ............... 01313/88

[51] Int. Cl.$^5$ ........................................... H04B 15/00
[52] U.S. Cl. ........................................ 375/58; 329/318; 332/159; 375/60; 375/99
[58] Field of Search ............... 375/39, 58, 15, 42, 375/40, 99, 100, 3; 455/60; 329/318, 349; 332/159

[56] References Cited

U.S. PATENT DOCUMENTS

| | | | |
|---|---|---|---|
| 3,289,082 | 11/1966 | Shumate | 455/60 |
| 4,518,922 | 5/1985 | Luecke | 375/120 X |
| 4,555,806 | 11/1985 | Lange et al. | 455/62 |
| 4,583,090 | 4/1986 | Eden et al. | 340/825.07 |
| 4,596,022 | 6/1986 | Stoner | 375/45 |
| 4,613,976 | 9/1986 | Sewerinson et al. | 375/54 |
| 4,616,364 | 10/1986 | Lee | 375/40 X |
| 4,628,517 | 12/1986 | Schwarz et al. | 375/40 |
| 4,733,402 | 3/1988 | Monsen | 375/100 |
| 4,853,686 | 8/1989 | Keung et al. | 375/111 X |

OTHER PUBLICATIONS

"An efficient ARQ technique with memory" by Giuliano Benelli, Alta Frequenza No. 4, Jul.-Aug. 1984, pp. 206-242.
"Memory Increases Capacity", J. Wolfowitz; Information and Control, No. 11 pp. 423-428, 1967.
NTIS Tech Notes, "Pilot-Tone System For Mobile Communications", Jan. 1987.

*Primary Examiner*—Curtis Kuntz
*Assistant Examiner*—Tesfaldet Bocure
*Attorney, Agent, or Firm*—Burns, Doane, Swecker & Mathis

[57] ABSTRACT

For the purpose of channel state estimation at the receiver end, a reference signal ($f_q(t)$) is added to and is transmitted with the data signal ($f_i(t)$) containing the actual information. The addition of the reference signal ($f_q(t)$) to the data signal ($f_i(t)$) is effected by means of a quadrature modulation with the reference signal on the Q-axis and with the data signal on the I-axis, the envelopes being selected so that the magnitude of the complex envelope is constant. The receiver has a function stage for preprocessing the receive signal, for quadrature detection of the data signal elements and reference signal elements ($y_i$) and ($b_i$) respectively, for selection of the data/reference signal and for estimating the channel state. This permits the operation of non-linear final stages of the transmitter and a maximum energy output from the transmitter, and the requirements of the short-wave transmission such as very low signal-to-noise ratio and signal interference ratio, fading, slightly drifting local oscillators and time bases, as well as high noise burst frequency are taken account of in an optimum manner. In addition the send signal has a narrow bandwidth and a low sensitivity to bit slip, which increases the connection probability and the robustness of the transmission.

17 Claims, 10 Drawing Sheets

METHOD AND DEVICE FOR THE DIGITAL TRANSMISSION OF INFORMATION IN SHORT-WAVE RADIO NETWORKS

BACKGROUND OF THE INVENTION

The present invention relates to a method for the digital transmission of information in short-wave radio networks having a plurality of stations with a transmitter and/or a receiver, in which, for the purpose of channel condition estimation at the receiver end, a reference signal is added to and is transmitted with the data signal containing the actual information.

Channels such as those of the short-wave, a priori those having an unknown phase angle, conventionally use non-coherent receiver detectors, for example frequency shift keying FSK or on/off keying OOK. If the fading can be designated as slow relative to the signal element duration, that is if the coherence time is considerably longer than one signal element, then a substantial gain can be obtained by utilizing the process memory. In this case a partial coherent detection is used in conjunction with a phase estimation from the receive signal, which is described for example in the book "Detection, Estimation and Modulation Theory", Part I, by H. L. Van Trees, Wiley and Sons, New York 1968.

By means of the invention, these methods known hitherto only from theory are now to be improved and extended to the extent that they can be used to meet the special requirements of the short-wave transmission. These requirements are in particular extremely low signal-to-noise ratio (SNR) and signal interference ratio (SIR), fading, slightly drifting local oscillators and time bases, high noise burst frequency and influencing by the receiver AGC (AGC=automatic gain control).

SUMMARY OF THE INVENTION

The object is achieved according to the invention in that the addition of the reference signal to the data signal is effected by means of a quadrature modulation with the reference signal on the Q-axis and with the data signal on the I-axis, the envelopes being selected so that the magnitude of the complex envelope is constant.

The proposed method steps make possible the operation of non-linear final stages in the transmitter and a maximum energy output from the transmitter, which takes the listed requirements of the short-wave range into account to an optimum extent. A further advantage is that the send signal has a narrow bandwidth and a low sensitivity to bit slip.

The invention further relates to a device for carrying out the method stated, having a receiver for real-time processing of the received data.

The device according to the invention is characterized in that the receiver has in each case a function stage for preprocessing the receive signal, for quadrature detection of the signal elements, for selection of the data/reference signal and for estimating the channel state.

BRIEF DESCRIPTION OF THE DRAWINGS invention will become apparent from the following detailed description of preferred embodiments as described in conjunction with the accompanying drawings in which.

DETAILED DESCRIPTION OF THE PREFERRED EMBODIMENTS

The method described below and the associated device for the digital transmission of information at a slow information rate are conceived for the special requirements of the short-wave transmission and take into account particularly the following interference conditions:

Extremely low signal-to-noise ratio (SNR) and signal interference ratio (SIR);
Fading;
Slightly drifting local oscillators and time bases;
High noise burst frequency; and
Influencing by high frequency (HF) receiver AGC.

The device, (i.e., the modem), works together with commercially available high frequency single-sideband (HF SSB) transmitter/receivers and generates and processes signals in the baseband of the SSB telephone channel between 300 and 3400 hertz. The optimization of the data transmission takes place solely in the specified HF channel of 3 kHz bandwidth and has no influence whatsoever on the HF channel frequency or on other parameters of the HF system. An implementation as a subsystem in a superordinate system can likewise be advantageously realized.

The realization is effected by means of digital signal processing. A prior necessary frequency and bit synchronization is preferably carried out with the methods described in the European Patent Application No. 87,105,972.1 (=EP-A-243 885) of Apr. 23, 1987 and in the Swiss Patent Application No. 03 795/87-2 of Sep. 29, 1987. The analog part described in these two patent applications, the disclosures of which are hereby incorporated by reference, and the processor architecture likewise described therein can easily be integrated into the modem here. Since the analog part of the modem is, in accordance with a preferred embodiment of the present invention, identical to the analog part described in the patent applications mentioned above, it will not be explained in more detail here.

The establishment of a radio link as described in the aforementioned patent applications which proceeds with a fixed opening mode is only adaptive to a limited extent. In contrast, the data transmission essentially has the following degrees of freedom for adaptation:
Operating mode;

Modulation;
Coding, code rate;
Baud rate;
Subchannel frequency;
Transmitting power.

During data transmission, in addition to the actual information, channel quality data (LQA=Link quality analysis) and commands for the system adaptation (EOW=engineering order wire) are also transmitted. The information to be transmitted is coded block-by-block with a set of M binary sequences, a fixed block length of N=128 being retained and only the code rate in the form of the number M of the sequences and the baud rate being varied. The receiver makes its hypothesis decision in each case once per block and assigns this a symbol from the set of M symbols.

Both ARQ mode (=automatic repeat request) and broadcast mode are possible, a method being used for the ARQ mode which, under the designation memory-ARQ (MARQ), is analogous to known methods (G. Benelli "An efficient ARQ Technique with Memory", ALTA FREQUENZA No. 4, 1984). The repetition with accumulation at the receiving end corresponds in a certain manner to a self-adapting code rate. In the device, the use of channel condition information and data in unquantized form (soft decision), which increases the capacity of a transmission system for channels with memory, is utilized (J. Wolfowitz "Memory increases Capacity", Inform. Control 11, 1967). In particular in the short-wave channel, both the signal-distorting and the additive disturbances are model functions of greatly memory-bound random processes (fading, noise bursts, frequency-selective disturbances).

At the receiving end, the phase and the amplitude of the received signal elements are preferably estimated from the fading channel, the phase being used for the partially coherent detection and the amplitude being used for the decoder as channel state information. A linear channel state estimation is made from the reference signal additionally sent at the same time. The reference signal is known a priori to the receiver in the undistorted state, that is without information.

For the addition of the reference signal to the data signal, a quadrature modulation with the reference signal on the Q-axis and the actual data signal on the I-axis was selected, which are optimized for the transmission efficiency according to the channel capacity defined by C. E. Shannon.

Figure 1:
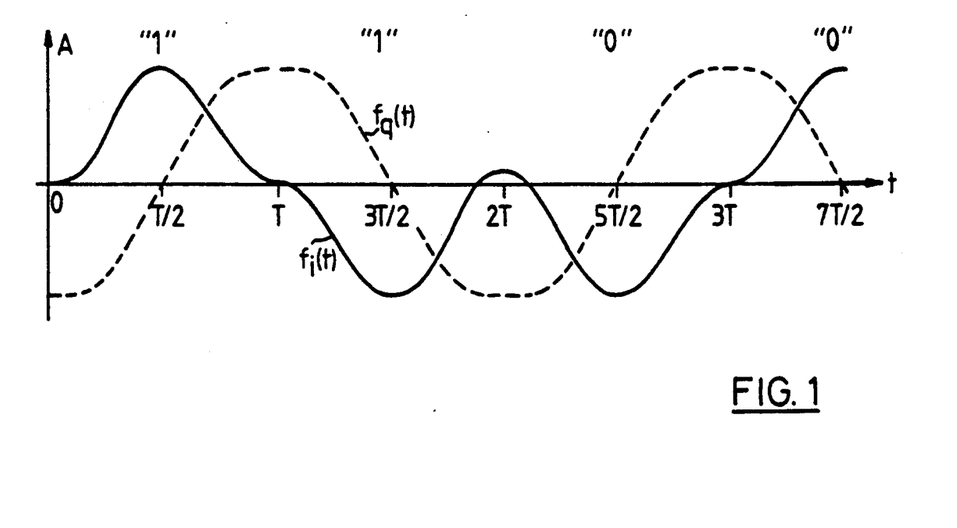
FIG. 1 shows a diagram illustrating the envelope functions.

Following this general description, the invention will now be explained in greater detail with reference to the drawings:

FIG. 1 shows a diagram of the temporal curve of the amplitude A of the data signal and of the reference signal, the envelopes $f_i(t)$ and $f_q(t)$ respectively of which are selected so that the magnitude of the complex envelope is constant. T denotes the observation duration (=signal element duration). This permits the operation of non-linear final stages in the transmitter and a maximum energy output from the transmitter. The send signal is thus overall a pure phase modulation and, owing to the configuration illustrated, has a narrow bandwidth and a low sensitivity to bit slip. In view of these advantages of constant amplitude, narrow bandwidth and perfect time slip estimation, the slightly greater portion of reference energy in the complex signal, in comparison to the theory, is not significant.

Both envelope functions $f_q$ and $f_i$ are based on the raised cosine function:

$$f(t) = +/-(a - b \cdot \cos(2\pi \cdot t/T)),$$

where O is less than t is less than T.

Figure 2:
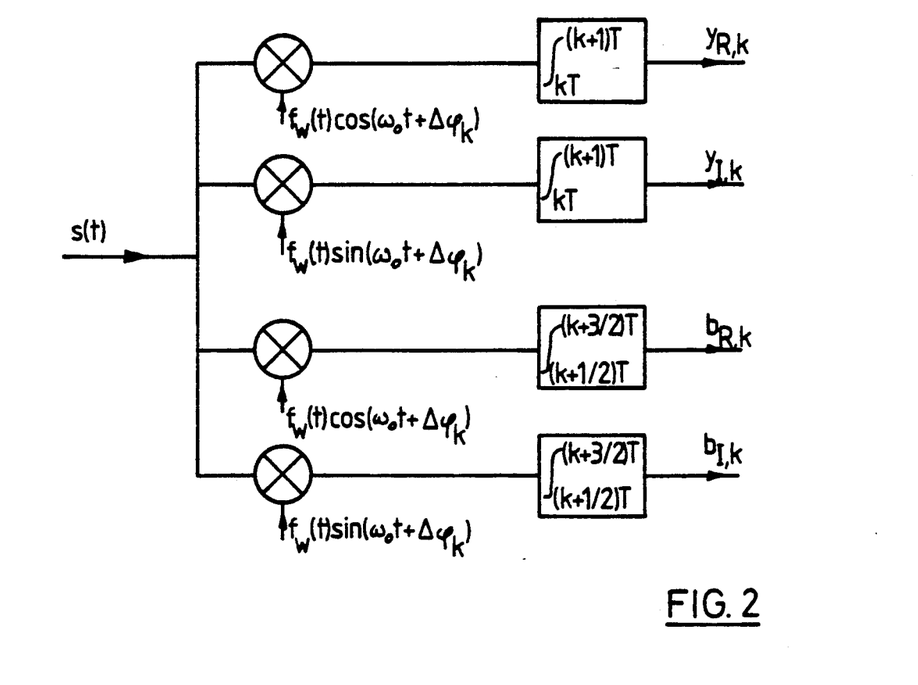
FIG. 2 shows a diagram of the receiver correlator structure.

The coefficients a and b are dependent on the respective pulse interval. Taking into account the receiver correlator structure illustrated in FIG. 2 with the observation duration T and the so-called window function fw(t) for side lobe attenuation of adjacent interference signals in terms of frequency, a and b can be derived from the orthogonal condition. In FIG. 2, s(t) denotes a carrier-modulated pulse, Phi denotes the phase offset of the receiver oscillator from the carrier of s(t); the output signals y and b of the integrators are the data signal elements and reference signal elements.

A distinction must be drawn between three cases which are evident in FIG. 1 in the intervals (O,T), (T/2, 3 T/2) and (3 T/2, 5 T/2) respectively.

Case 1: $a = b = 0.5$    3 Intervals with identical symbol $f_q(t) = \sqrt{(1 - f_i(t) \cdot f_i(t))}$ Case 2: $a = b = 0.5$    Reference interval $f_q(t) = \sqrt{(1 - f_i(t) \cdot f_i(t))}$ Case 3: $a = 0.38$  $b = 0.61$    Interval with symbol change $f_q(t) = \sqrt{(1 - f_i(t) \cdot f_i(t))}$ Owing to the use of digital signal processing processors, these complex send waveforms can be generated simply and are available to the receiver virtually in ideal form. The reference signal is on average only about half as sensitive to bit slip, (i.e., inexact synchronization between receiver and transmitter), as the data signal, which is of importance for the reliable estimation of the phase reference in the receiver.

Since the noise power density in short-wave channels can fluctuate very greatly within a three kHz channel, and gaps in the interference spectrum of less than 100 Hz bandwidth can be utilized again and again, (the interference situation, however usually being different at the transmitter and receiver end), the send signal is preferably split up into several partial signals with different frequencies (i.e., the so-called frequency diversity technique). In the present method, four subchannels with fixed frequencies are defined.

Figure 3:
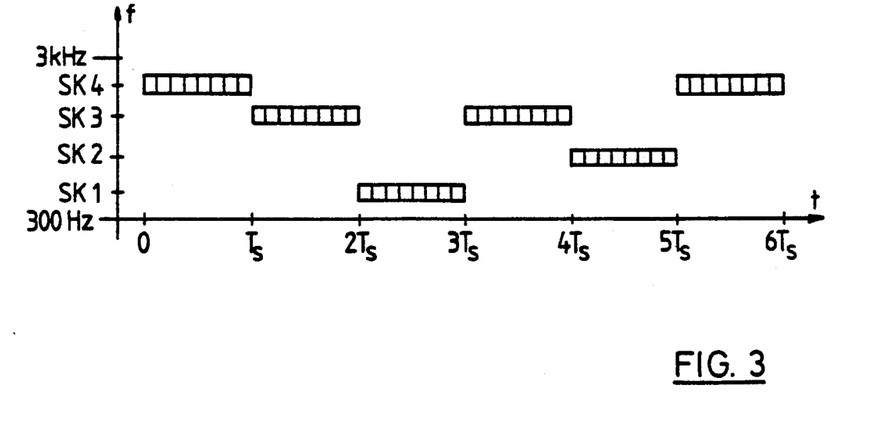
FIG. 3 shows a possible hopping sequence of the send signal.

Instead of the simultaneous transmission of the same information on four different frequencies, a frequency hopping technique is used, a subchannel frequency being selected pseudo-randomly or in step-like manner for each data sequence of the length $N_s$ and the duration $N_s \cdot T$. The dwell time $T_s$ is thus $T_s = N_s \cdot T$ and is sufficiently long for a channel state estimation. The subchannel selection is then preferably continuously optimized during the transmission as commanded by the receiver, so that relatively disturbance-free subchannels are utilized. In contrast to the multitone diversity technique, this results advantageously in a constant transmitting power. A possible hopping sequence is illustrated diagrammatically in FIG. 3.

It is evident from the description hitherto that the transmitter part requires only little special technical outlay. The automatically adapting receiver, however, requires an even more complex signal processing. With the digital signal processors available today, however, a reliable system realization is possible. Real-time processing of all data and parameters is necessary here, which demands the optimum use of the digital components available. Advantageous in this connection is the capability of storing all data in the widest sense, thanks to their digitization, as well as the aging freedom and the adjustment-free production and maintenance as a consequence of the fully digital signal processing architecture.

A rough division of the functions of the overall receiver results in the following function stages:
Receive signal preprocessing;
Quadrature detection;
Estimation of the channel condition;
Demodulation of the channel condition;
Demodulation of the data;
Estimation of the synchronization parameters;
Statistical recording of the fading process and statistical analysis of the subchannels;
Adaptation of the estimation process and synchronization corrections (tracking);
Accumulation of demodulated data;
Decoding;
Subchannel frequency hopping.

Figure 4:
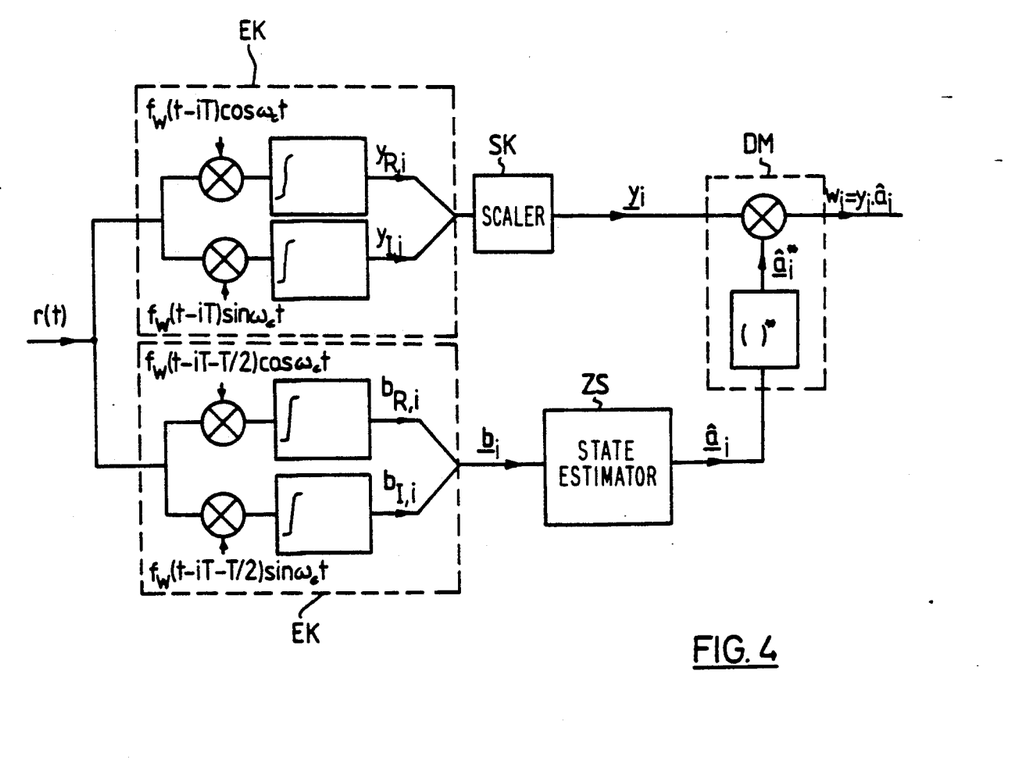
FIG. 4 shows a basic diagram of an adaptive receiver.

It is defined for the receiver that the complex values of the quadrature detection of the ith data signal element and reference signal element yi and bi, respectively are components of the receive vector which are detected element-by-element from the receive signal and are stored in quantized form. The basic principle of the receiver is indeed evident from FIG. 4, with all auxiliary devices being omitted, but it is depicted in a form which cannot physically be realized. FIG. 4 shows the receiver correlators EK, following these a scaler SK for the data signal elements yi and a state estimator ZS for the reference signal elements bi and finally a data demodulator DM. The depicted form of the state estimator ZS is "acausal", i.e. cannot be realized physically.

The coding and decoding of the transmitted data is a problem which can be separated from the overall demodulation operation, which can be selected according to the desired error detection capability, correction capability and burst disturbance behavior and in each case according to the operating mode ARQ or broadcast. Preferably Hadamard codes can be used which have the property of paired orthogonality between the code vectors of a set. The decoding by means of the Hadamard transform, related to the discrete Fourier transform, is thus an algorithm which is simple to implement and which can utilize the architecture of the signal processor.

Figure 5:
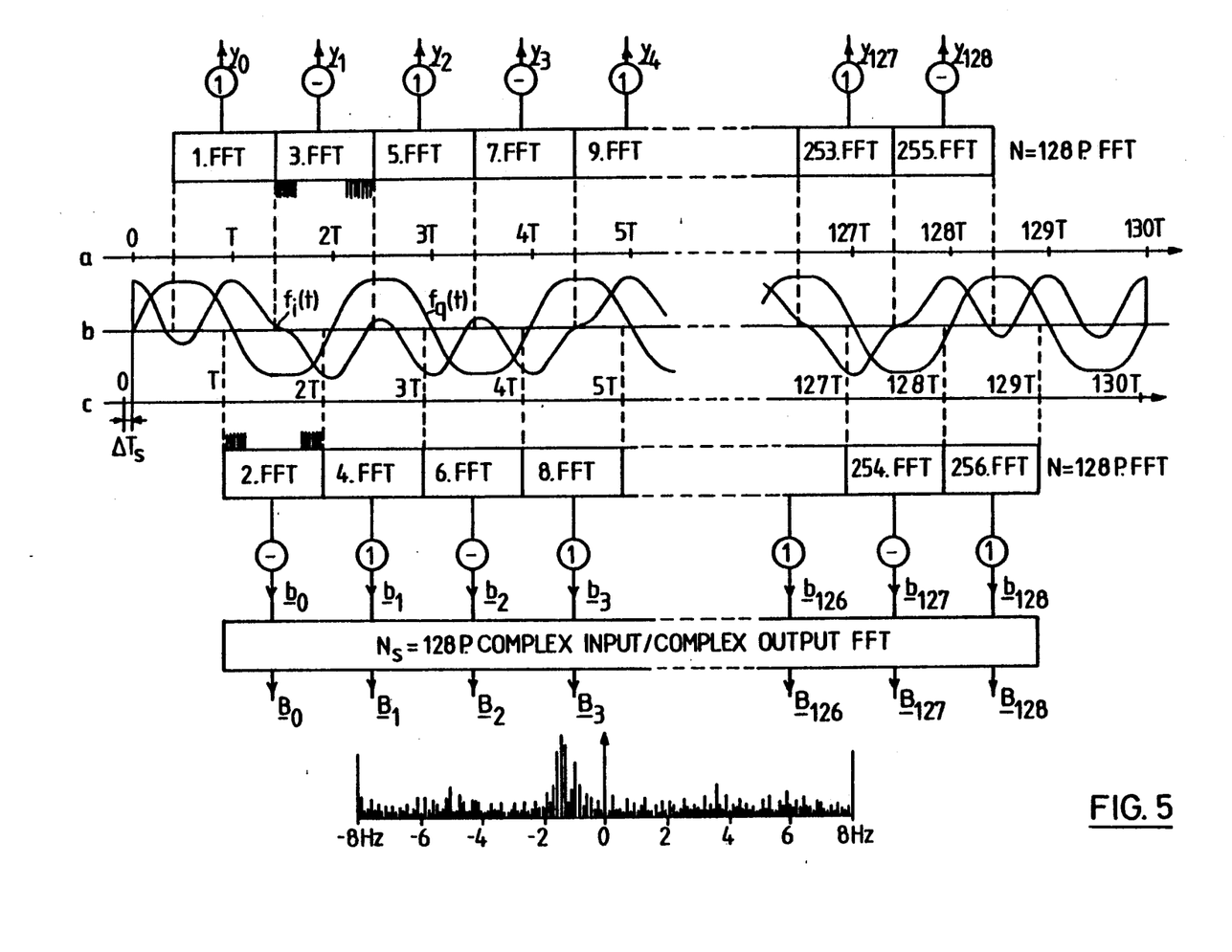
FIG. 5 shows a diagram of the continuous detection of the data signal and of the reference signal.

FIG. 5 shows the continuous detection of the data signal and reference signal. Line a plots the transmitter time, line b the data signal $f_i(t)$ and the reference signal $f_q(t)$, line c the receiver time, which exhibits a time slip delta $T_s$ compared with the transmitter time, and finally line d plots the signal spectrum calculated from the reference signal elements $b_i$.

The elements of the duration T of the data signal and reference signal are detected in quadrature by means of correlation (FIG. 2). This time-discrete correlation is realized in the form of a bank of detectors which work simultaneously on different channels with the aid of the fast Fourier transform (FFT). Besides the desired signal samples, this FFT also supplies the data for an additional noise analysis. The value N of the FFT is dependent on T, that is on the baud rate, and is set out in Table 1. RB denotes the baud rate, T is stated in milliseconds.

TABLE 1

| RB | T | N |
|---|---|---|
| 16 | 62.5 | 128 |
| 32 | 31.3 | 64 |
| 64 | 15.6 | 32 |
| 128 | 7.8 | 16 |

The transformation is effected alternatingly with successive FFT of time intervals mutually overlapping by T/2 analogous to EP-A-243 885. FIG. 5 shows the procedure for N=128 and the division of the FFT spectra into data signal elements and reference signal elements $y_i$ and $b_i$ respectively is evident; of which $N_s = 128$ in each case is one block length.

Figure 6A:
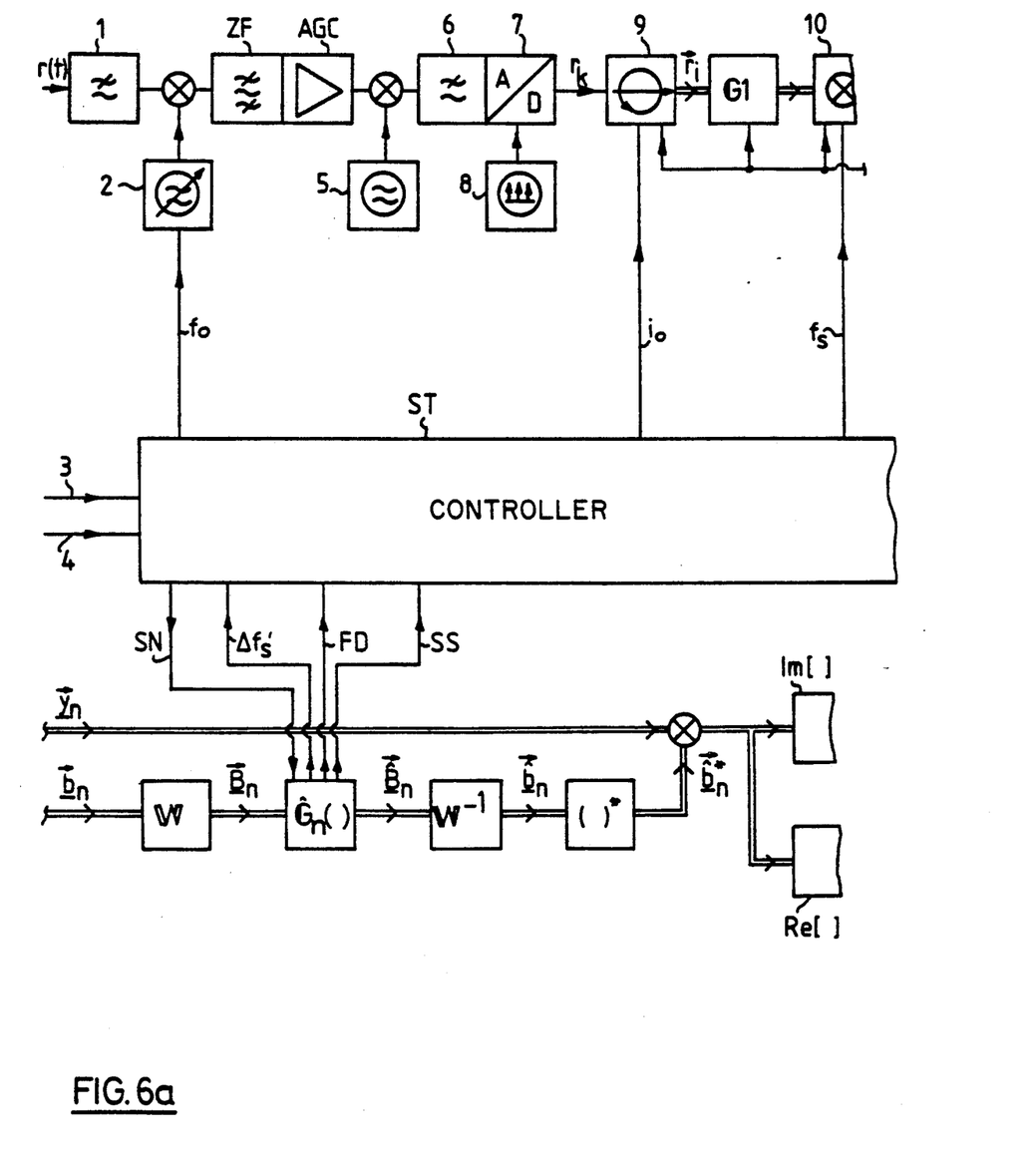
FIGS. 6a-b show a block circuit diagram of the numeric signal processing of the receiver.
Figure 6B:
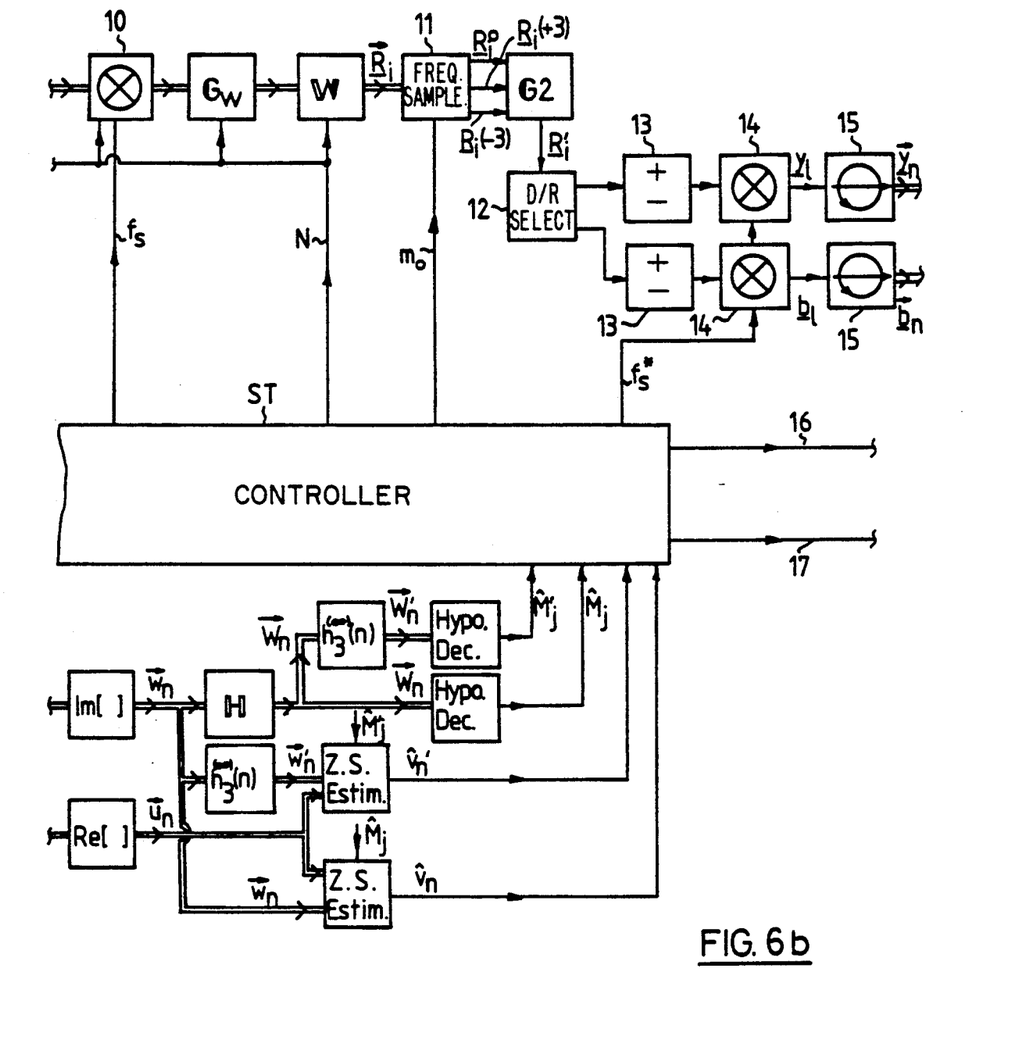

FIG. 6 shows a block circuit diagram of the numeric signal processing of the receiver, which has been divided into two FIGS. 6a and 6b for reasons of space. The two figures are to be thought of as adjacent, FIG. 6b lying to the right of FIG. 6a. It should also be noted that the lower part in the figures follows the upper part, that is the input signal r(t) from the HF receiver arrives at the top left in FIG. 6a and runs through the upper series of components up to the output vectors yn and bn at the top right of FIG. 6b. Said output vectors are then the input signals at the bottom left in FIG. 6a.

According to the representation, the adaptive receiver has a central controller ST for the individual stages. The input signal r(t) from the HF SSB receiver in the frequency band between 300 Hz and 3 kHz is prefiltered with a low-pass filter 1. The filtered signal is mixed upward into a receive band by a variable oscillator 2 and subsequently filtered with an IF filter (500 Hz wide bandpass filter). Regardless of the filter center frequency, the signal is mixed down into a processing band between 250 Hz and 750 Hz by a second mixer 5 and is converted into 16-bit digital values at a sampling rate of 2048 Hz. The A/D converter is denoted by 7, and the generator for the sampling pulse is denoted by 8. The reference symbol 6 denotes an image-frequency filter and AGC denotes an AGC circuit which ensures a correct utilization of the dynamics of the A/D converter 7 (see also EP-A-243 885). The variable oscillator 2 is controlled by the controller ST with the subchannel frequency $f_o$.

Figure 7:
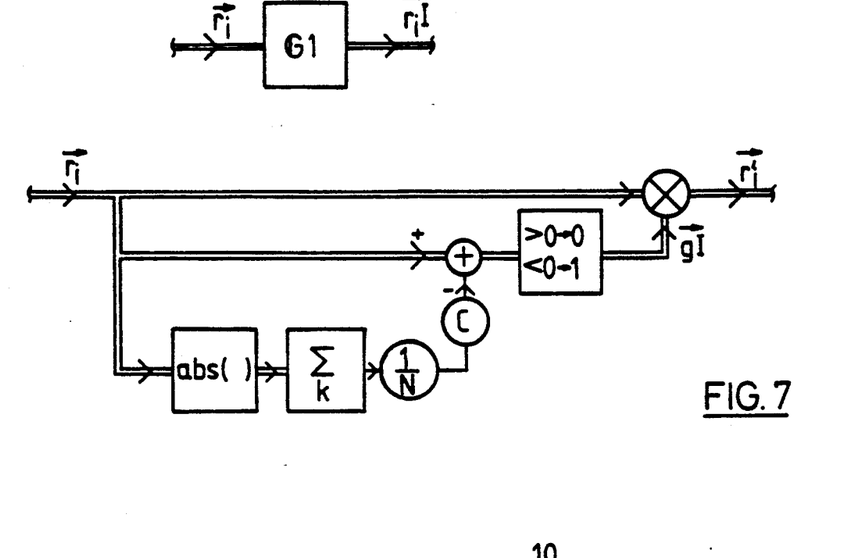
FIG. 7 shows a process diagram of the short burst filter of the receiver.

Connected to the A/D converter 7 is an input buffer memory 9 which receives the start pulse $i_o$ for the bit synchronization from the controller ST. Before the vectors $r_i$ are Fourier-transformed, three operations take place in the time domain. The first of these is a burst filtering in a first burst filter G1 for bursts of the duration $T_B$ much shorter than T. This filtering is based on the assumption that noise and wanted signal do not vary significantly over the time duration T. Short noise bursts can therefore be identified as statistical freak values which excessively exceed the arithmetic mean of the ith detection interval T. A two-value filter function with the weightings $g_i(k) = 0$ or 1 eradicates the burst values. The associated process diagram is shown in FIG. 7.

Figure 8:
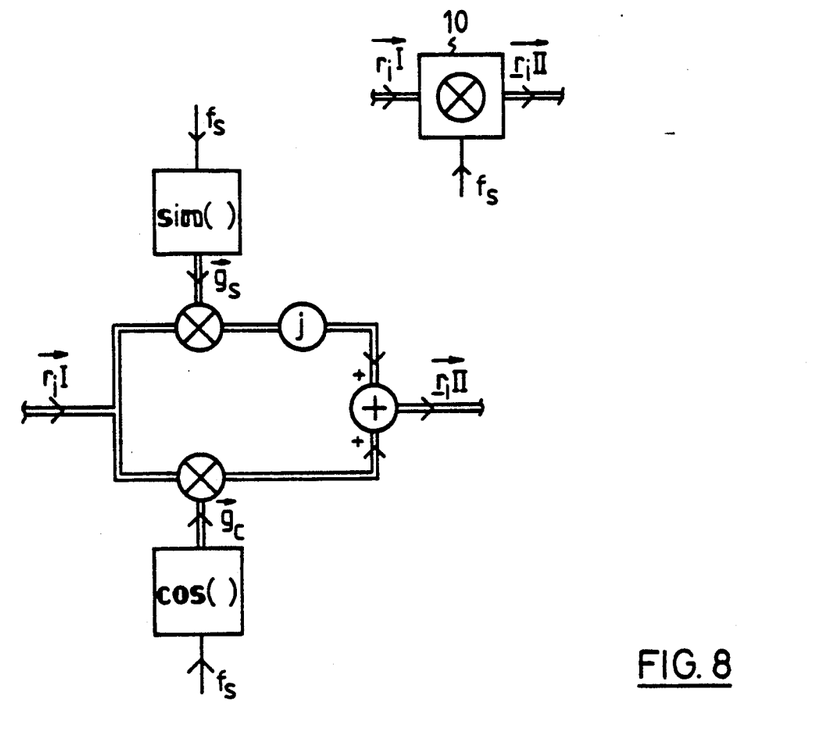
FIG. 8 shows a process diagram of the frequency shifter of the receiver.

When a connection is established between two modems, in accordance with EP-A-243 885, the carrier frequency departure is estimated to within plus/minus 1 Hz and forwarded as a synchronization parameter to the described modem receiver. On the basis of this value and the baud rate required, the receiver calculates the frequency $m_o$ of the discrete spectrum nearest to the estimated signal. The frequency component at this point is defined as the detection value of the data signal and reference signal. A frequency shifter 10 in FIG. 6 ensures that the input signal is shifted by the difference $f_s$ between the FFT raster and the estimated frequency from the connection establishment. The accuracy is subsequently plus/minus 1 Hz; FIG. 8 shows the process diagram necessary for this.

A weighting is subsequently carried out with the window function $f_w(t)$ which serves to increase the side lobe attenuation of the correlators of adjacent frequency domain samples and as a matched filter for the envelope form of the data signal. This function is preferably stored in a ROM with Nmax=128 real sampling values. A 4-term Harris window $G_w$ was found to be an optimum solution. The fast Fourier transform (FFT) W then takes place. This is an N-point transform (see Table 1); the FFT is correspondingly controlled by the controller ST with the vector dimension N. The result of the FFT is a signal vector $R_i$.

For the further processing after the FFT, three samples are selected in a stage 11, namely the frequency domain sample at $m_o$, at $m_{o+3}$ and at $m_{o-3}$. The two latter values are decorrelated detection values from the frequency environment of the wanted signal and they are required for determining the background noise level in the following long burst filter G2. It should be noted that as a result of the shift by T/2 for uneven values of m, each second detection value requires a sign correction.

Long bursts are mainly noise bursts with 0.5·T is less than t is less than 5·T. These are no longer unambiguously identifiable within the sampling value sequence of length N. However, they are detectable in that there is a sudden great increase in the magnitudes of successive detection values. Fluctuations due to fading and AGC occur in similar time periods and make the simple identification of long bursts more difficult. The device thus uses a continuous averaging in a digital low-pass filter of first order with a time constant 5·T and compares its value with the current magnitudes of $y_i$ or $b_i$:

$$R'_{(i)} = a_1 \cdot R_{(i-1)} + b_i \cdot R_{(i)}.$$

An increased reliability of the burst detection is produced with two additional similar detections of the noise on adjacent frequencies. These are obtained as mentioned at $m_{o+3}$ and $m_{o-3}$, that is at the frequency distance delta $f = 3/T$. A comparison logic analyzes the situation present.

Figure 9:
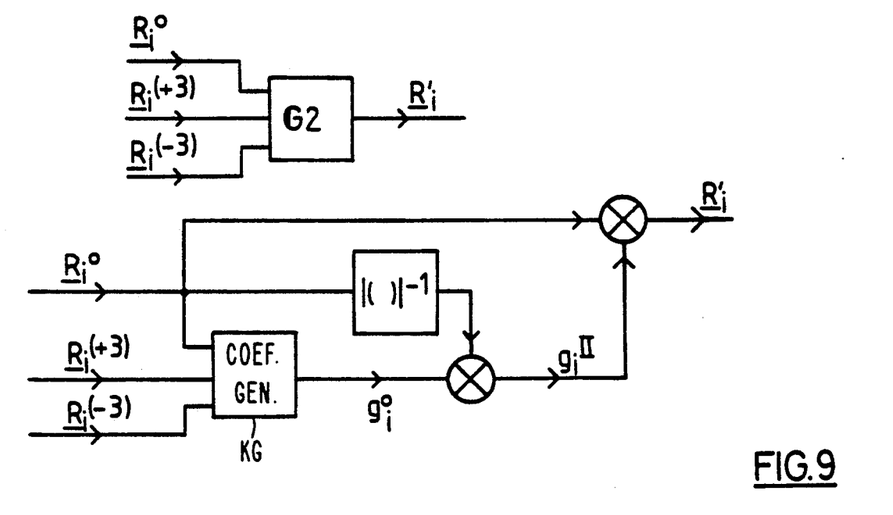
FIGS. 9-11 show process diagrams of the long burst filter.
Figure 10:
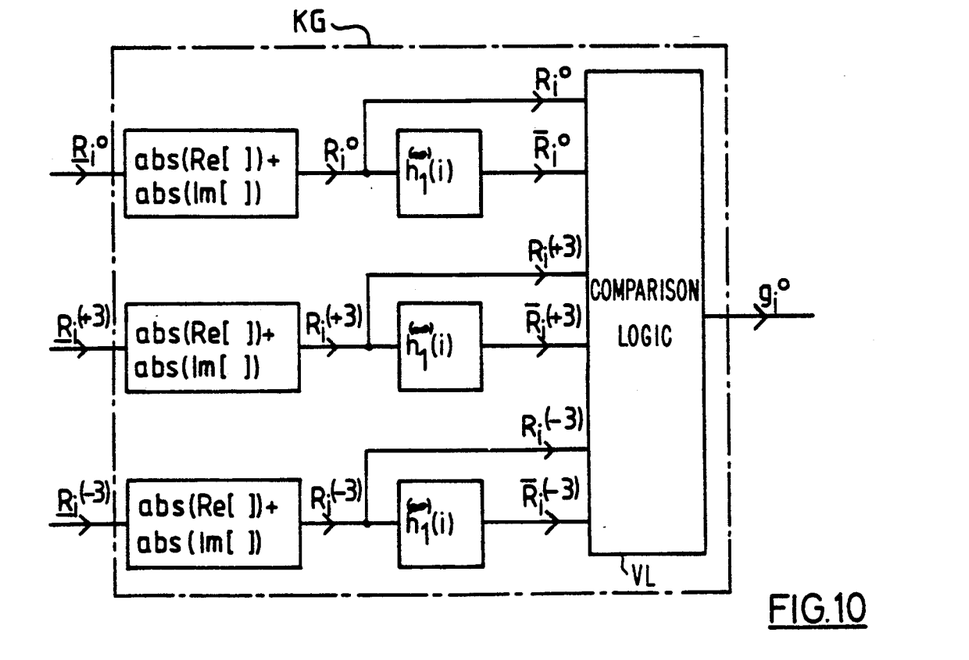
Figure 11:
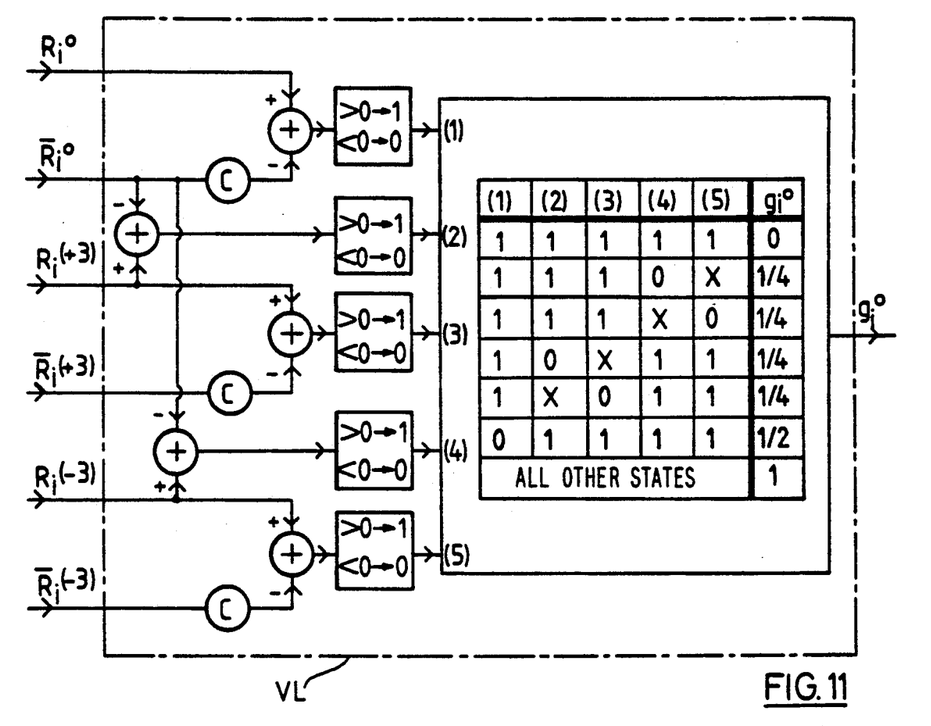

FIG. 9 shows the process diagram of the long burst filter G2 and the unity scaling, FIG. 10 shows the subroutine for the coefficient generation KG of FIG. 9, and FIG. 11 shows the subroutine of the comparison logic VL of FIG. 10. According to FIG. 11, the comparison logic VL contains five burst detectors which take their input signals from the three mean values and from the three current values. The logic determines the class of the burst result and assigns this one of four weighting factors $g_i$ (0, $\frac{1}{4}$, $\frac{1}{2}$, 1). The following applies to the assignment of these weighting factors:

$g_i = 0$: Where there is coincidence of the burst detection on all five detectors.

$g_i = \frac{1}{2}$: Where bursts are only on the adjacent frequencies of $m_o$ with greater current value than the mean value of $m_o$.

$g_i = \frac{1}{4}$: Where bursts are only on the frequency $m_o$ and one of the adjacent frequencies and there is a smaller mean value at mo than the current value of the adjacent frequency.

$g_i = 1$: For all other states.

The data/reference signal selection is denoted by 12. It can be seen from FIG. 5 that the first detection value (i=o) and hence all other detection values with even i meet the data signal elements of a received sequence. It follows that detection values with odd i contain the reference signal and can be easily split off. Thus the detection values $y_i$ with the data signal lie at one output of the data/reference signal selection 12 and the detection values $b_i$ with the reference signal lie at the other output.

A sign alternation subsequently takes place in two stages 13 for both types of detection values. Such an alternation is necessary according to FIG. 5 at each second data signal and reference signal detection value, in order to provide these values for a correct demodulation. Two second frequency shifters 14 then follow, each of which is followed by a second buffer memory 15 which stores $N_s$ detection values. The second frequency shifters 14 serve to compensate for any frequency drift.

This compensation takes place as soon as a usable estimated value of the drift is available; said estimated value $f_s^*$ is supplied by the controller ST. The second frequency shifter stage 15 has an accuracy of $$\text{delta } f_s = 1/N_f tT$$

which yields only 0.0078 Hz as frequency increment at the minimum baud rate (RB=16). $N_f$ is the size of the ROM table for cosine/sine values and in practice amounts to 2048. The compensation of a frequency drift assumed to be constant is effected by a linearly increasing frequency shifting in the opposite direction. As soon as the instantaneous compensation frequency exceeds the value 1 Hz, the above mentioned fine synchronization is readjusted by 1 Hz and the instantaneous superfine synchronization is reset to zero. This ensures that the carrier frequency is always close to the frequency point of the FFT at $m_o$ and the detection remains optimum.

There are therefore a total of four frequency control facilities:

1. Subchannel frequency selection (analog) with the oscillator 2;
2. Coarse frequency alignment with the FFT (stage W) and the selection of $m_o$;
3. Fine frequency alignment with the first frequency shifter 10;
4. Super-fine alignment (drift compensation) with the second frequency shifter 14.

The channel condition is estimated by the autoadaptive filtering of the reference signal in the frequency range. It was found that, by means of a superordinate fast Fourier transform W, a system vector $B_n$ can be generated from the vectors $b_n$ (see also FIG. 5) provided in the buffer memory 15, for which system vector it can be claimed that the greatly statistically dependent, successive reference signal elements are now statistically decoupled. The vector bn itself is additively composed of the actual channel state vector a and of a noise portion n. An estimation of a is $G_n$ and subsequent inverse Fourier transform W to the power $-1$:

$$\text{vector } a_n = W \text{ to the power } -1 \, G_n \cdot W \cdot \text{vector } b_n.$$

Figure 12:
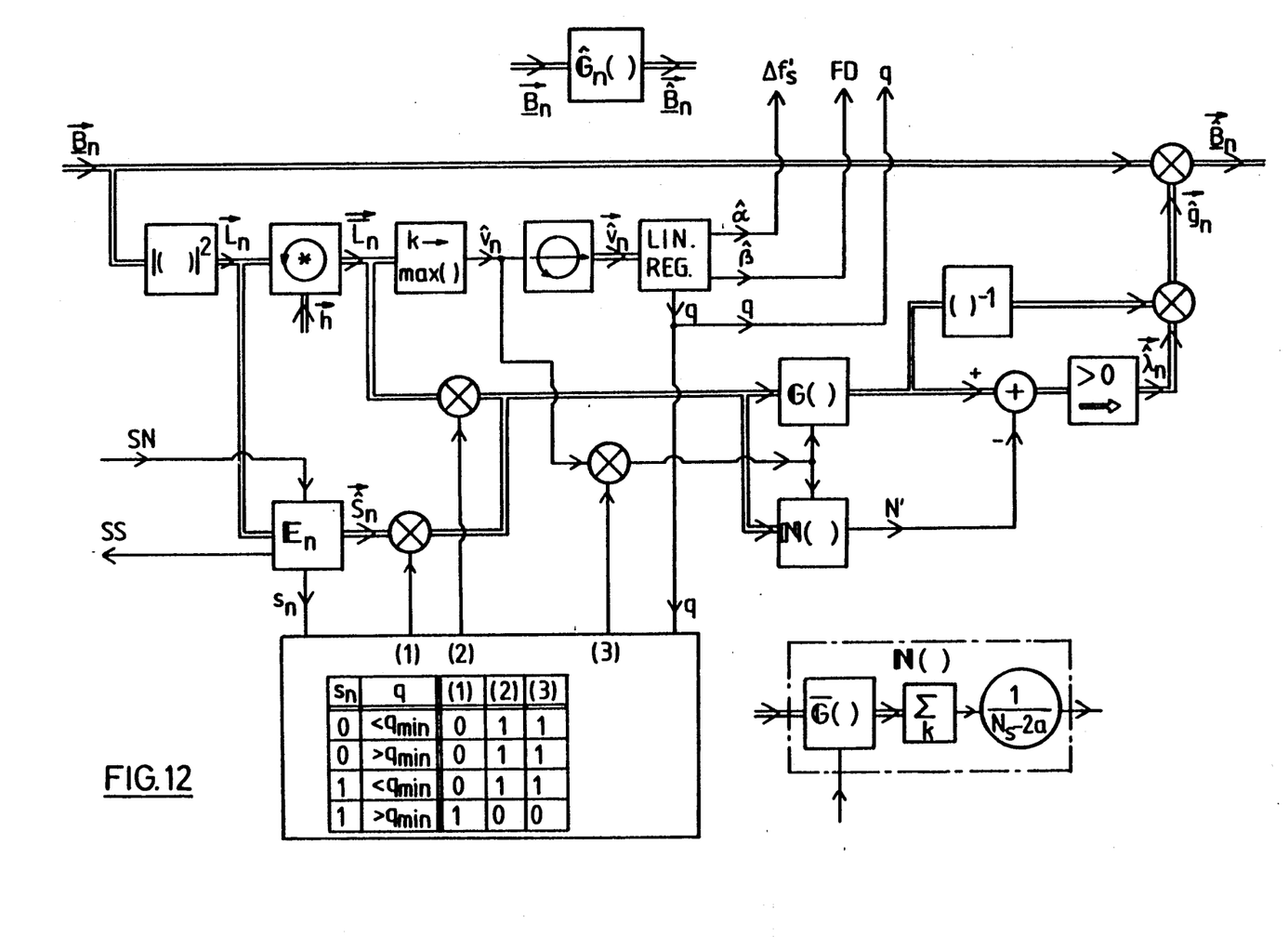
FIG. 12 shows a process diagram of the frequency filter of the receiver.

The weighting function is thus accorded the significance of a filtering in the frequency range. The frequency range filter with estimation of frequency drift and departure is illustrated in FIG. 12.

The matrix $G_n$ has a diagonal form with the elements $$\text{Lamda (i)/(Lamda (i)} + N')$$

where 1 is less than/equal to i is less than/equal to $N_s$.

The Eigen values of the fading process Lamda (i) are exactly the samples of the discrete power density spectrum of the fading process a and are obtained by subtracting the noise $N'$ from the total power density spectrum $L_n$. $N'$ is the uniform noise power density. The coefficients of $G_n$ are determined either on the basis of the smoothed spectrogram $L_n$ or on the basis of a spectrogram $S_n$ averaged over time. As available, the coefficients of $G_n$ are estimated from the smoothed vector $\bar{L}_n$.

In FIG. 6a there are drawn in between the weighting matrix $G_n$ and the controller ST four connecting lines which are provided for the following control parameters: the line SN for the subchannel number (1 to 4), the line delta $f_s'$ for the frequency offset, the line FD for the frequency drift and the line SS for the subchannel statistics.

$N'$ is determined with the subroutine $N(v_n)$ shown in FIG. 12. Here, $v_n$ is the position of the maximum of the smoothed vector $L_n$; $G(v_n)$ and $\overline{G}(v_n)$ are two component windows which ensure that only such components of $L_n$ are allowed through which can be assigned to the wanted signal or to the noise only. The smoothing operation of the spectrograms takes place with a circular convolution of $L_n$ with a cosine window and serves to reduce the estimation error variance for the determination of $v_n$, the maximum position of the smoothed spectrum $L_n$ (see also in this connection: A. V. Oppenheim, R. W. Schafer "Digital Signal Processing", Prentice Hall, N.Y.).

For determining the parameters for a linear regression for the estimation of the frequency offset delta $f_s'$ and the frequency drift FD, Ny=8 determined maxima $v_n$ are loaded into a buffer memory and provided as vector v. If a sufficient quality of the regression is achieved, the frequency compensation of the receiver is switched on.

Figure 13:
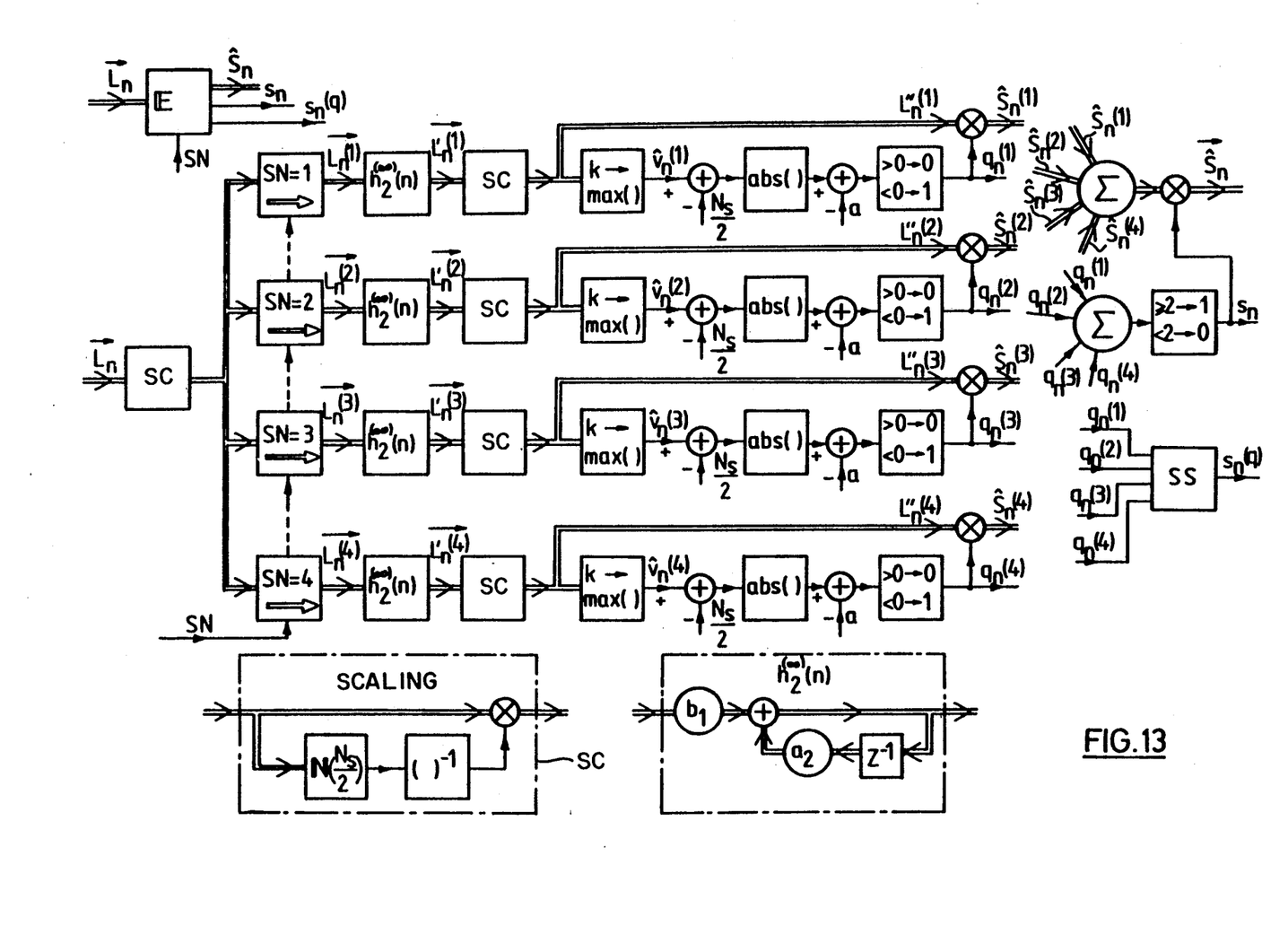
FIG. 13 shows a process diagram of the subchannel spectrum estimation.

The filter coefficients can now be calculated on the basis of the averaged periodograms $S_n$ instead of from the smoothed vector $L_n$ (Bartlett Method, A. V. Oppenheim, R. W. Schafer "Digital Signal Processing", Prentice Hall, N.Y.). For this purpose, a continuous averaging is carried out in a low-pass filter of first order subchannel-by-subchannel in order to take account of the different disturbance situations on the individual subchannels. Before and after the averaging process a scaling skal is performed so that the noise level is brought to a uniform value (see FIG. 13, which shows a detail of FIG. 12).

Before the averaged periodograms $L'_n$ are summed, they are tested individually for their quality; that is, it is tested whether the maximum of $L'_n(k)$ is located sufficiently in the region of the center of the periodogram:

$N_s/2-a$ is less than/equal to k is less than/equal to $N_s/2+a$ a corresponds here to half the window width for the wanted signal. Once this condition is fulfilled, the gate for summation is opened.

The use of the vector $S_n$ for coefficient generation requires that at least two subchannels achieve the quality. This is indicated by the variable $s_n$. Once $s_n=0$ is reached, then a switchover is made again to the smoothed spectrograms. The linear regression is then carried out again with the period Ny and thus the drift and departure of the received reference signal is kept constantly under control. The long-term quality of the individual subchannels is determined from statistics of the determined qualities $q_n$ and the erasure statistics of the data decoding, and can thus be used, as the line SS in FIG. 6a shows, for an adaptive operation.

Figure 14:
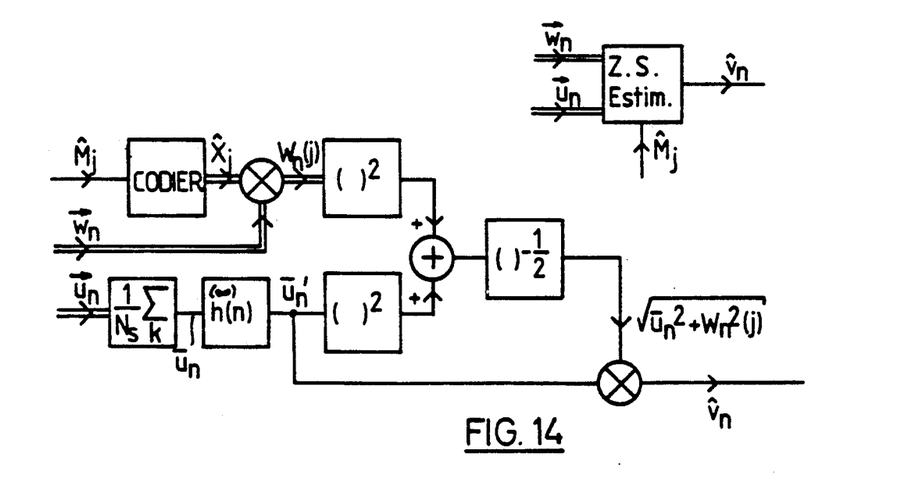
FIG. 14 shows a process diagram of the time slip estimator of the receiver.

After the inverse Fourier transformation W to the power $-1$, the receive vectors $y_n$ are multiplied by the conjugated complex output vectors $b_n^*$ of the autoadaptive filter. This causes a rotation of the receive vector $y_n$ by the angle phi$_{ref}$ obtained from the channel state estimation (partially coherent demodulation). The real part and the imaginary part are used for decoding and for time slip estimation. The real part $u_n$ represents a sensitive value for the time slip $T_s$. Since with noisy receive signals the values of $u_n$ are liable to error, averaging must be carried out over a large number of values. Since even in the case of the highest baud rate (RB=128) applied in the described device, drifts of quartz-stable time bases take effect only after a few minutes of transmitting time, all components of the vector $u_n$ of a whole sequence of the length $N_s$ are arithmetically averaged, as seen in FIG. 14. These average values are continuously averaged once again in a digital low-pass filter of first order. Furthermore, a compensation of the time slip should only take place when a data sequence has fulfilled the decoding criterion.

Since the transmitted data vector is then known, it is then possible, depending on whether the code word was detected from the accumulator or directly, to calculate the time slip in accordance with FIG. 14, by scaling the averaged $u_n$ values with the detection value of the hypothetical received code word. The function stage h(n) drawn in FIG. 14 is only present in the time slip estimator Z.S.Estim. (output Signal $\hat{v}_n'$) at the top in FIG. 6b. The scaling is necessary for reasons of receiver level dependency. The error values $\hat{v}_n$ and $\hat{v}_n'$ respectively move in the range $-1$ to $+1$ and are used for slip compensation in a control loop. For the decoding of the vectors, $w_n$ which are demodulated and weighted with channel state information, the latter are now Hadamard-transformed. With a threshold value comparison for each component of the output vector $W_n$, the position of any received code word is then determined (see the characteristics of the Hadamard code). If several fulfill the threshold value condition, then the greatest is selected according to the maximum likelihood principle. This decision is based on the Neyman-Pearson criterion, in which detection and error probability can be traded off against each other.

When the information is not received immediately, then repeated sequences are continuously averaged in the demodulated form of vector $W_n$ in an accumulator:

Vector $W(n) = 1/n((n-1)\cdot\text{vector } W(n-1) + \text{vector } W(n))$.

Hence n is the repetition number and the threshold test is implemented analogously to the above mentioned.

Two outputs, denoted by 16 and 17, of the controller ST serve to forward the decoded data to the terminal, or the data (request, subchannel selection, baud rate) for the acknowledgement.

The universality of the digital signal processors used permits completely new system concepts, which until a short time ago had only theoretical significance. Mathematical functions such as Fourier transformation, convolution and correlation can be implemented today in technical systems.

At the same time an increase in the reliability, stability, aging freedom and simplified production is achieved. The present method and the associated device of a LRT (low-rate transmission) data modem utilizes this potential and these advantages fully for improving the information transmission on channels with a high proportion of interference signals and channel parameters which fluctuate greatly in terms of time, as all occur above in the transmission over short-wave channels.

Communication possibilities up down to a signal-to-noise ratio of SNR=−30 dB at 3 kHz AWGN (additional white gaussian noise) are opened up with the secondary conditions of maximum 0.5 Hz Doppler spread and 50 mHz/s frequency drift.

The data throughput is particularly suitable for small quantities of data and varies adaptively between 0.1 and 50 bit/s depending on the state of the channel and the interference situation. In comparison with conventional means, with such a modem a connection is virtually never interrupted and the maximum possible throughput is always achieved within the adaptive data rate. The character error rate is, for the above parameters, less than CER=10 to the power −3. Instable local oscillators and time bases are automatically compensated and readjusted, and within a channel of 3 kHz bandwidth the frequency position of the wanted signal is adapted (modem-integrated intelligence for subchannel selection). Moreover, for the ARQ mode, the data sequences with errors are accumulated in order to increase the efficiency of the transmission (memory automatic repeat request=MARQ). A robust link establishment matched to the performance of this modem with selective call and full synchronization is available and is described in detail in the patent applications already cited several times.

The adaptive, robust LRT data modem can be operated as a stand-alone auxiliary device for any radio station, or be integrated in a fully automatic radio station. The latter method can utilize the advantages that the measured channel quality data (LQA), as well as the transmitted channel state information and control commands of the remote station (EOW) can be evaluated in a control computer together with radio propagation predictions for the communication task to be fulfilled, and a complete system can be optimally set and adapted (e.g. frequency management). For emergency radio systems and military applications, the robustness can also be utilized conversely, in that only a low transmitting power is required (weight, power consumption of transmitter) or the send signal remains hidden in the spectral occupancy by other users and noise (camouflaged transmission). Advantages compared to the known burst or frequency hopping techniques are seen particularly in the second case, in that an interception of the high send pulse powers or the relatively long dwell times in the case of short-wave hopping techniques on one frequency is simpler (conspicuous features) than the discovery of a spectrally below-average signal on the usually greatly occupied channels.

It is, of course, possible to embody the invention in other specific forms than those of the preferred embodiment described above. This may be done without departing from the essence of the invention. The preferred embodiment is merely illustrative and should not be considered restrictive in any way. The scope of the invention is embodied in the appended claims rather than in the preceding description and all variations and changes which fall within the range of the claims are intended to be embraced therein.

What is claimed is:

1. Method for the digital transmission of information in short-wave radio networks having a plurality of stations with a transmitter and/or a receiver to enable robust, efficient data communications, comprising the steps of:

adding at the transmitter a predetermined reference signal to a data signal containing actual information for estimating channel state at the receiver end, addition of the reference signal to the data signal being effected by a quadrature modulation with the reference signal on a Q-axis and with the data signal on an I-axis, envelopes of the reference signal and the data signal being selected so that the magnitude of a complex envelope of the quadrature modulated signal is constant;

transmitting the added reference and data signals; and, processing the quadrature modulated signal as a receiver input signal by detecting a received signal vector element-by-element, each element of said signal vector representing a complex value of a quadrature detection of an ith receiver input signal time interval and the complex value consisting of an ith data signal element and reference signal element, the quadrature detection being realized by correlation, said correlation being implemented by applying fast Fourier transforms (FFT0 of mutually overlapping time intervals of the receiver input signal and by alternatingly associating each FFT-processed interval with the ith data signal element and reference signal element; and, processing further said signal vector for channel adaptive data detection.

2. Method according to claim 1, wherein said step of transmitting further includes a step of splitting a transmitted signal into several partial signals with different frequencies, and a sub-channel frequency is selected pseudo-randomly or in step-like manner for each data sequence.

3. Method according to claim 2, wherein said step of transmitting the data signal and the reference signal further includes transmitting channel quality data and commands on the data signal for system adaptation to the channel state by altering code-rate, baud-rate and/or sub-channel frequency.

4. Method according to claim 3, wherein before applying the Fourier transforms of the receiver input signal, said step of processing the quadrature-modulated signal further includes the steps of executing a short duration burst noise filtering, a frequency shift of the received signal by the difference between discrete frequency points of the fast Fourier transform and an estimated frequency from the radio link establishment, and a window weighting.

5. Method according to claim 4, further comprising a step of selecting three frequency domain samples after the FFT for further processing as detection values.

6. Method according to claim 5, further comprising a step of effecting, after the selection of the detection values, a long duration burst noise filtering and a standard scaling.

7. Method according to claim 6, further comprising a step of selecting the combined data/reference signal on the basis of an index of the detection values, the detection values containing the reference signal with the corresponding index being split off.

8. Method according to claim 7, further comprising a step of estimating channel state information by autoadaptive filtering of the reference signal in the frequency domain, a system vector being first generated from the reference signal vector by a superordinate FFT, said system vector, in order to obtain the estimation of the channel state vector forming together with a noise term the additive components of the reference signal vector, being weighted with a weighting matrix and subsequently subject to an inverse Fourier transform.

9. Method according to claim 8, further comprising a step of effecting, following the inverse Fourier transform, a demodulation and then a decoding/accumulation and a time slip estimation.

10. Device for the digital transmission of information in short-wave radio networks having a plurality of stations with a transmitter and/or a receiver, comprising:
    a receiver for providing real-time processing of received data and including;
    a preprocessor function stage for preprocessing a receive signal;
    a quadrature detector function stage for quadrature detection of preprocessed receive signal elements, including data and reference signal elements;
    a selector function stage for separation of data/reference signals; and
    an estimator function stage for estimating the channel state using at least a portion of said receive signal.

11. Device according to claim 10, wherein the preprocessor function stage for preprocessing the receive signal includes an input filter, a first mixer, an IF filter, an AGC circuit, a second mixer, an image-frequency filter and an A/D converter, respectively arranged in series.

12. Device according to claim 10, wherein for quadrature detection of the receive signal elements the quadrature detector function stage for quadrature detection has a bank of detectors which work simultaneously on different frequencies with the aid of a first fast Fourier transform FFT.

13. Device according to claim 12, wherein upstream of the FFT a first burst filter, a first frequency shifter and a 4-term Harris window are interconnected.

14. Device according to claim 10, wherein the selector function stage for the selection of the data/reference signal includes a frequency selector, a second burst filter and a data/reference signal selector, and said function stage for the selection of the data/reference signal further includes two sign changers, two second frequency shifters and two buffers memories, in each case one for the data signal and one for the reference signal.

15. Device according to claim 10, wherein the estimator function stage for estimating the channel condition has an autoadaptive filter which includes a second fast Fourier transform performing a condition output vector, a weighting matrix and an inverse Fourier transform.

16. Device according to claim 15, wherein after the inverse Fourier transform, receive vectors corresponding to the data signal are multiplied by a conjugated complex value of the condition output vectors of the autoadaptive filter.

17. Device according to claim 16, wherein a real part and an imaginary part resulting from said multiplication are used for decoding the transmitting information and for time slip estimation.

* * * * *